(12) United States Patent
Hess

(10) Patent No.: US 7,493,723 B2
(45) Date of Patent: Feb. 24, 2009

(54) DECOY APPARATUS

(76) Inventor: Keith A. Hess, 1105 Main St., Spottsville, KY (US) 42458

( * ) Notice: Subject to any disclaimer, the term of this patent is extended or adjusted under 35 U.S.C. 154(b) by 0 days.

(21) Appl. No.: 11/524,573

(22) Filed: Sep. 21, 2006

(65) Prior Publication Data

US 2007/0062093 A1  Mar. 22, 2007

Related U.S. Application Data

(60) Provisional application No. 60/719,456, filed on Sep. 22, 2005.

(51) Int. Cl.
*A01M 31/06* (2006.01)
(52) U.S. Cl. .................................. 43/3; 43/2
(58) Field of Classification Search ............. 43/2, 43/3

See application file for complete search history.

(56) References Cited

U.S. PATENT DOCUMENTS

| | | | | |
|---|---|---|---|---|
| 833,966 | A | * | 10/1906 | Johnston ............... 43/3 |
| 1,316,566 | A | * | 9/1919 | Fauble ................. 43/3 |
| 1,468,979 | A | * | 9/1923 | Sherman et al. ........ 43/3 |
| 1,831,286 | A | * | 11/1931 | Chelini ............... 43/3 |
| 2,196,078 | A | * | 4/1940 | Pearce ................ 43/3 |
| 2,439,167 | A | * | 4/1948 | Jackson .............. 43/3 |
| 2,457,295 | A | * | 12/1948 | Woodhead ............ 43/3 |
| 2,536,736 | A | * | 1/1951 | Gazalski ............. 43/3 |
| 2,545,800 | A | * | 3/1951 | Viken ................ 43/3 |
| 2,662,327 | A | * | 12/1953 | Petersen ............. 43/3 |
| 2,663,108 | A | * | 12/1953 | Dixon et al. ......... 43/3 |
| 2,752,715 | A | * | 7/1956 | Miller ............... 43/3 |
| 2,755,588 | A | * | 7/1956 | Johnson ............. 43/3 |
| 2,787,074 | A | * | 4/1957 | Miller .............. 43/3 |
| 2,849,823 | A | * | 9/1958 | Miller .............. 43/3 |
| 3,059,368 | A | * | 10/1962 | Wortman ........... 43/3 |
| 3,245,168 | A | * | 4/1966 | Pool ................ 43/3 |
| 3,350,808 | A | * | 11/1967 | Mitchell ............ 43/3 |
| 3,408,763 | A | * | 11/1968 | Rudolph ............ 43/3 |

(Continued)

FOREIGN PATENT DOCUMENTS

EP    1279333 A2 *  1/2003

(Continued)

*Primary Examiner*—Darren W. Ark

(57) ABSTRACT

A decoy apparatus adapted for spontaneous and continuous movement in response to the wind and other external stimuli, the decoy apparatus includes a body and a head, the body includes an upper torso aperture aligned with a lower torso, and an open front end having at least one body slot. An end of the head includes at least one pivot connector designed to releaseably connect with one of the at least one body slots. The end of the head further includes a counterweight sized and positioned to balance the head with the body. The decoy further includes a support stake that is received through the upper torso aperture, passes through the body of the decoy, and extends through the lower torso aperture. A lower end of the stake defines a shovel portion that in application, is received in the ground surface. An upper end of the stake includes a slot used as an attachment point for a body harness. The body further includes at least a pair of apertures preferably disposed at lower ends of the body, the pair of apertures are further used as attachment points for the body harness. The body harness is centrally connected between the slot in the stake and each of the pair of apertures in the body.

13 Claims, 7 Drawing Sheets

U.S. PATENT DOCUMENTS

| | | | |
|---|---|---|---|
| 3,435,550 A * | 4/1969 | Carlson | 43/3 |
| 3,916,553 A * | 11/1975 | Lynch et al. | 43/3 |
| 3,927,485 A * | 12/1975 | Thorsnes, Jr. | 43/3 |
| 4,128,958 A * | 12/1978 | Snow | 43/3 |
| 4,251,937 A * | 2/1981 | Curley | 43/3 |
| 4,611,421 A * | 9/1986 | Jacob | 43/3 |
| 4,651,457 A * | 3/1987 | Nelson et al. | 43/3 |
| 4,689,913 A * | 9/1987 | Brice | 43/3 |
| 4,753,028 A * | 6/1988 | Farmer | 43/3 |
| 4,829,694 A * | 5/1989 | Oasheim | 43/2 |
| 4,852,288 A * | 8/1989 | Payne et al. | 43/2 |
| 4,893,428 A * | 1/1990 | Gagnon, Sr. | 43/3 |
| 4,965,953 A * | 10/1990 | McKinney | 43/2 |
| 4,972,620 A * | 11/1990 | Boler | 43/3 |
| D325,617 S * | 4/1992 | Smith | D22/125 |
| 5,136,800 A * | 8/1992 | Lanius | 43/3 |
| 5,144,764 A * | 9/1992 | Peterson | 43/3 |
| 5,231,780 A * | 8/1993 | Gazalski | 43/3 |
| 5,274,942 A * | 1/1994 | Lanius | 43/2 |
| 5,289,654 A * | 3/1994 | Denny et al. | 43/3 |
| 5,322,386 A * | 6/1994 | Trangsrud | 405/19 |
| 5,375,363 A * | 12/1994 | Higdon | 43/3 |
| 5,392,554 A * | 2/1995 | Farstad et al. | 43/3 |
| 5,632,110 A * | 5/1997 | Roy | 43/2 |
| 5,832,649 A * | 11/1998 | Kilgore | 43/2 |
| 6,021,594 A * | 2/2000 | Krueger | 43/2 |
| 6,044,581 A * | 4/2000 | Shipman et al. | 43/3 |
| 6,079,139 A * | 6/2000 | Berry | 43/2 |
| 6,092,322 A * | 7/2000 | Samaras | 43/2 |
| 6,092,323 A * | 7/2000 | McBride et al. | 43/3 |
| 6,216,382 B1 * | 4/2001 | Lindaman | 43/2 |
| 6,266,912 B1 * | 7/2001 | Jirele | 43/2 |
| 6,374,530 B1 * | 4/2002 | Mierau | 43/2 |
| 6,385,895 B1 * | 5/2002 | Scaries | 43/2 |
| 6,481,147 B2 * | 11/2002 | Lindaman | 43/2 |
| 6,560,912 B1 * | 5/2003 | Achepohl | 43/3 |
| 6,561,468 B2 * | 5/2003 | Williamson | 43/3 |
| 6,643,971 B2 * | 11/2003 | Daniels | 43/3 |
| 6,708,440 B2 * | 3/2004 | Summers et al. | 43/2 |
| 6,708,649 B1 * | 3/2004 | Lalor | 43/2 |
| 6,834,458 B1 * | 12/2004 | Hand et al. | 43/3 |
| 6,877,267 B2 * | 4/2005 | Burton | 43/2 |
| 6,901,693 B1 * | 6/2005 | Crowe | 43/2 |
| 7,028,429 B1 * | 4/2006 | Druliner | 43/3 |
| 7,076,909 B2 * | 7/2006 | Heinn et al. | 43/2 |
| 7,225,579 B2 * | 6/2007 | Haley | 43/3 |
| 2004/0025400 A1 * | 2/2004 | Salato | 43/3 |
| 2005/0138855 A1 * | 6/2005 | Jensen | 43/3 |
| 2006/0053675 A1 * | 3/2006 | Lindaman | 43/2 |
| 2006/0123688 A1 * | 6/2006 | Box et al. | 43/3 |
| 2006/0143969 A1 * | 7/2006 | Lindaman | 43/2 |

FOREIGN PATENT DOCUMENTS

| | | | |
|---|---|---|---|
| FR | 2873265 A1 * | 1/2006 | |
| GB | 1385023 A * | 2/1975 | |
| GB | 1454523 A * | 11/1976 | |
| GB | 2067064 A * | 7/1981 | |
| GB | 2189124 A * | 10/1987 | |
| GB | 2412560 A * | 10/2005 | |

* cited by examiner

DECOY APPARATUS

CROSS REFERENCES TO RELATED APPLICATIONS

U.S. Provisional Application for Patent No. 60/719,456, filed Sep. 22, 2005, with title "Decoy Apparatus" which is hereby incorporated by reference. Applicant claims priority pursuant to 35 U.S.C. Par. 119(e)(i).

Statement as to rights to inventions made under federally sponsored research and development:

Not Applicable

BACKGROUND OF THE INVENTION

1. Field of the Invention

This invention relates to a decoy apparatus for such as, but not restricted to bird hunters. Specifically, the present invention relates to the inclusion of wind activated motion to assist in a more lifelike presentation of the decoy.

2. Brief Description of Prior Art

Decoys are often used to influence bird behavior. Hunters use decoys to attract birds. Farmers use decoys to scare birds away from crops. Full-body decoys for attracting game birds is known in the art. Most game hunters will agree that the more realistic the appearance and behavior of an animal decoy the greater the probability that the game will be attracted to the decoy. As a result, decoy development has continued to grow.

There are a number of patents pertaining to movements in decoys. U.S. Pat. No. 4,611,421 shows a decoy that includes resilient strips that support the neck and back. The strips flex during changes in wind pressure to give movement to the decoy neck and body. As the neck and body of '421 move together, the decoy movements are relatively stiff and unrealistic. U.S. Pat. No. 4,852,288 utilizes rubber bands between the neck and body. Movements of the head and neck are controllable to suit different wind speeds by changing the rubber bands.

As such, while the prior art full-body and/or shell decoys have improved in representing the animal to be decoyed in a stationary position, the prior art has generally failed in developing a decoy that appears to be active. In fact, in some cases, attempts to create decoy movement have resulted in decoys that can actually scare game away.

As will be seen from the subsequent description, the preferred embodiments of the present invention overcome these and other shortcomings of the prior art.

SUMMARY OF THE INVENTION

The present invention in the preferred embodiment is a decoy apparatus adapted for spontaneous and continuous movement in response to the wind and other external stimuli, thereby providing a realistic simulation of a wildfowl for hunting and the like. In this regard, the present invention is adapted to move in various directions to wind forces for example, and responsively return to its original position. In addition, both the head and body can move simultaneously or independent of one another. The body includes an upper torso aperture aligned with a lower torso aperture at the approximate center of the body. The body further includes an open front end having at least one body slot. An end of the head includes at least one pivot connector designed to be releaseably connected with one of the at least one body slots. The end of the head further includes a counterweight sized and positioned to balance the head with the body and allow for movement of the head with respect to the body. The decoy further includes a support stake that is vertically received through the upper torso aperture, passes through the body of the decoy, and extends through the lower torso aperture. A lower end of the stake preferably defines a shovel portion that in application, is received in the ground surface. An upper end of the stake includes a slot used as an attachment point for a body harness. The body further includes at least a pair of apertures preferably disposed at lower ends of the body, the pair of apertures further act as attachment points for the body harness to support the body when attached to the stake. The body harness is centrally connected between the slot in the stake and each of the pair of apertures in the body. The body harness primarily serves to support the body when attached to the stake, allows the body to move in various directions, i.e., horizontal, vertical, and orbital and, causes the body to return to an idle position after movement in response to the wind and other external stimuli, thereby providing a realistic simulation of a wildfowl for hunting and the like.

DESCRIPTION OF THE PREFERRED EMBODIMENT

Figure 1:
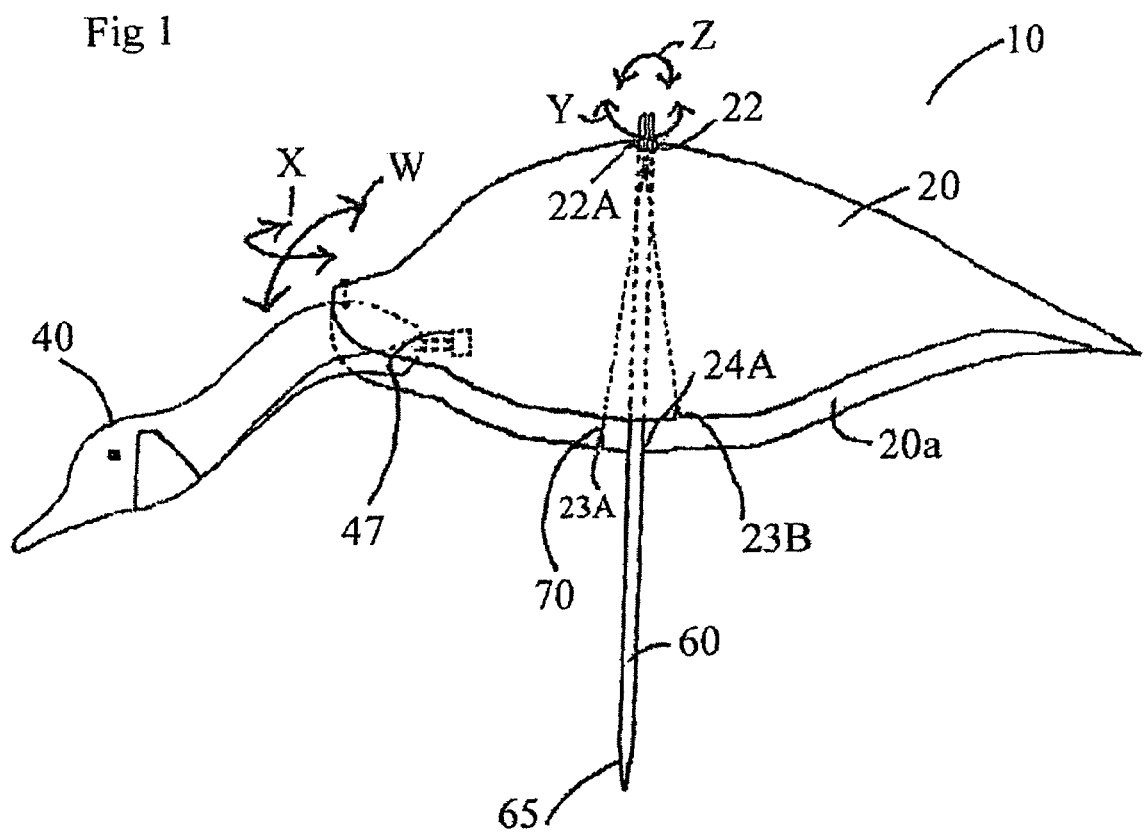
FIG. 1 is a side view of the preferred embodiment of the present invention, a decoy apparatus.
Figure 2:
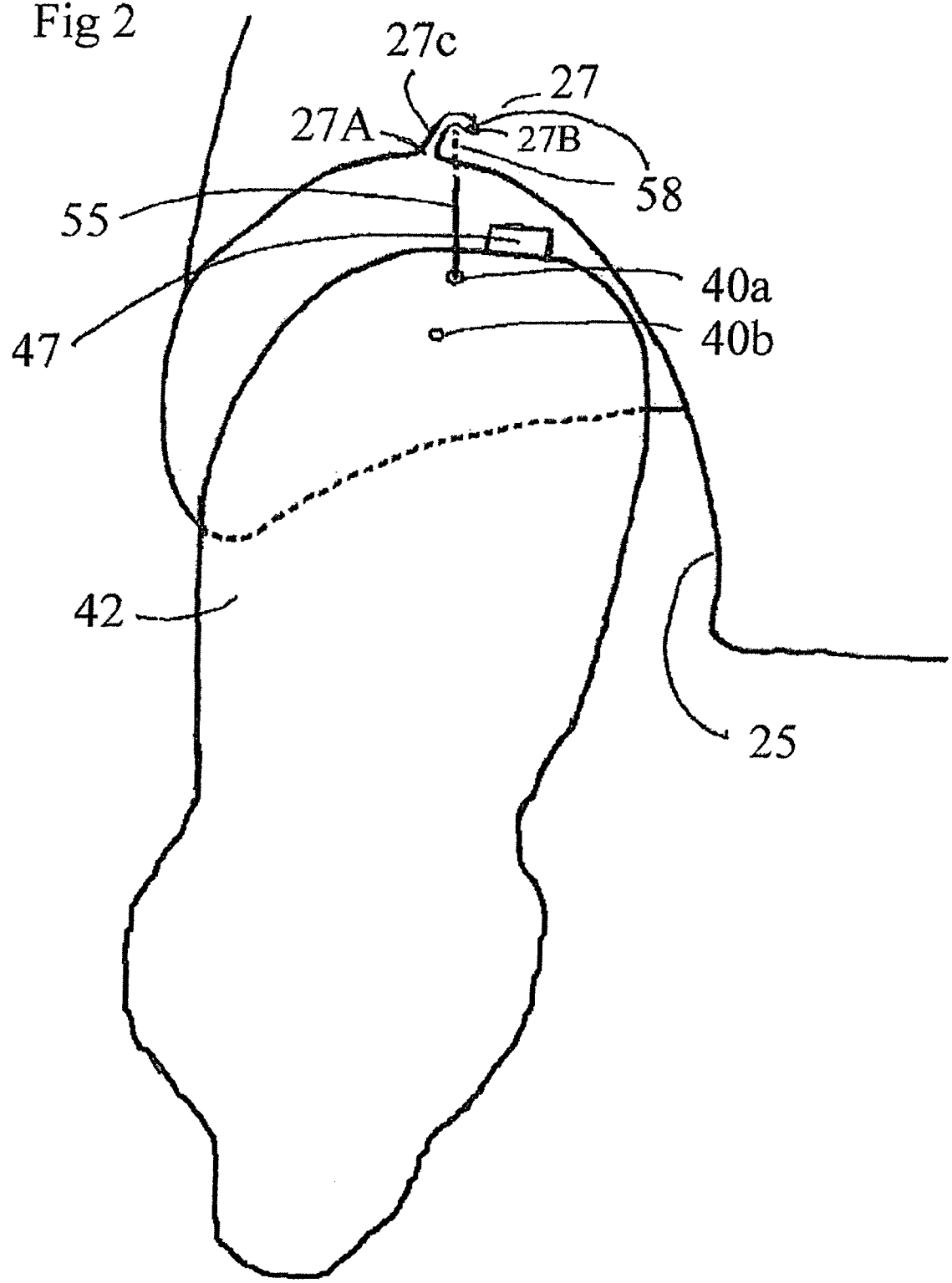
FIG. 2 is a front perspective view of the decoy apparatus of FIG. 1.

In accordance with the present invention, a decoy apparatus is disclosed. The decoy apparatus is directed to a full-body or shell decoy adapted for realistic movement responsive to the wind and other external stimuli. In the broadest context, the decoy apparatus of the present invention consists of components configured and correlated with respect to each other so as to attain the desired objective.

FIGS. 1-6 illustrate the preferred embodiment of an animal decoy apparatus 10 made in accordance with the present invention. The decoy apparatus 10 generally includes a body 20 and a head 40. The body 20 forms an open shell and is hollow on the interior 20A and is shaped and decorated for the exterior to resemble the selected wildfowl. The body 20 could be formed from a single flat sheet which in turn can be blow molded into the selected shape or using conventional vacuum and/or thermoforming to form the shell body 20 shape. The body 20 includes an upper torso aperture 22 sized to receive a support stake 60 as will be further described, and a lower torso aperture 24. As will be understood, with respect to the body 20, the upper torso aperture 22 is in aligned relationship with the lower torso aperture 24. Further, the upper and lower torso apertures 22, 24 are selectively positioned at pivot points 22A, 24A, respectively, at a center of balance location.

The body 20 further includes an open front end 25 sized to receive an end 42 of the head 40. The open front end 25 includes at least one body slot 27 for, as will be described, releaseably connecting the head 40 to the body 20. The at least one body slot 27 is selectively positioned along the upper surface of the front end 25 of the body 20. The at least one body slot 27 is designed with an entrance 27A, a receiving portion 27B and a channel 27C disposed between the entrance 27A and the receiving portion 27B.

The head 40 is shaped and decorated on the exterior to resemble the selected wildfowl, consistent with the body 20. The end 42 of the head 40 includes at least one pivot connector 55 for connecting the head 40 to the body 20. The at least one pivot connector 55 is selectively positioned along the upper surface of the end 42 of the head 40. The pivot connector 55 is preferably constructed of a weatherproof flexible material such as a braided nylon line and includes knots 75. One end of the connector 55 is attached to the head 40 with the connector 55 passing through the hole 40A in the head 40 until it stops. The opposite end 58 of the connector 55 is designed to be releaseably connected with one of the at least one body slots 27 thereby connecting the head 40 to the body 20. More particularly, the end 58 of the connector 55 is received by the entrance 27A of the selected body slot 27, passes through the channel 27C, and into the receiving portion 27B, the receiving portion 27B being sized and shaped to receive and maintain the end 58 therein. The end 58 can include a knot.

As is well known by most hunters, the position of the head of a wildfowl has various meanings, and as such, different activities are known to be indicated by the head position. For example, a head position can show attitude, sleeping, calling or fear. With the present invention, as there can be more than one connector 55 positioned on the head 40, consequently the opposite end 58 of one of the selected connectors 55 can be inserted into any one of the slots 27 in order to mimic the head 40 position to these desired positions and make the decoy 10 more attractive to a wildfowl.

The end 42 of the head 40 further includes a counterweight 47 that can be attached thereon or be integral to the head 40. Preferably, the counterweight 47 is disposed at the end 42 of the head 40 and in application, is concealed by the body 20. The counterweight 47 is sized and positioned to balance the head 40 with the body 20 and allow for movement of the head 40 with respect to the body 20 to simulate movement of a body part of an animal. If movable, the counterweight 47 could be formed by a movable screw such that rotation of the screw would change the idle position or the screw could be moved to different holes in the head 40 that would also change the balanced idle position. FIG. 1 shows that the head 40 can move from an idle position shown, left to right as indicated by arrows X and the head 40 can move up and down as indicated by arrows W. The body 20 can rotate about a stake 60 as indicated by arrows Y and can also rotate up and down as indicated by arrows Z. All of these motions can be occurring at once giving the decoy a compound motion or the motions can occur individually. Each motion occurs about a stable idle position as shown in FIG. 1, the head 40 and the body 20 will, acting under its own weight, tend to return to this initial position with the head 40 and body 20 balanced.

Figure 3:
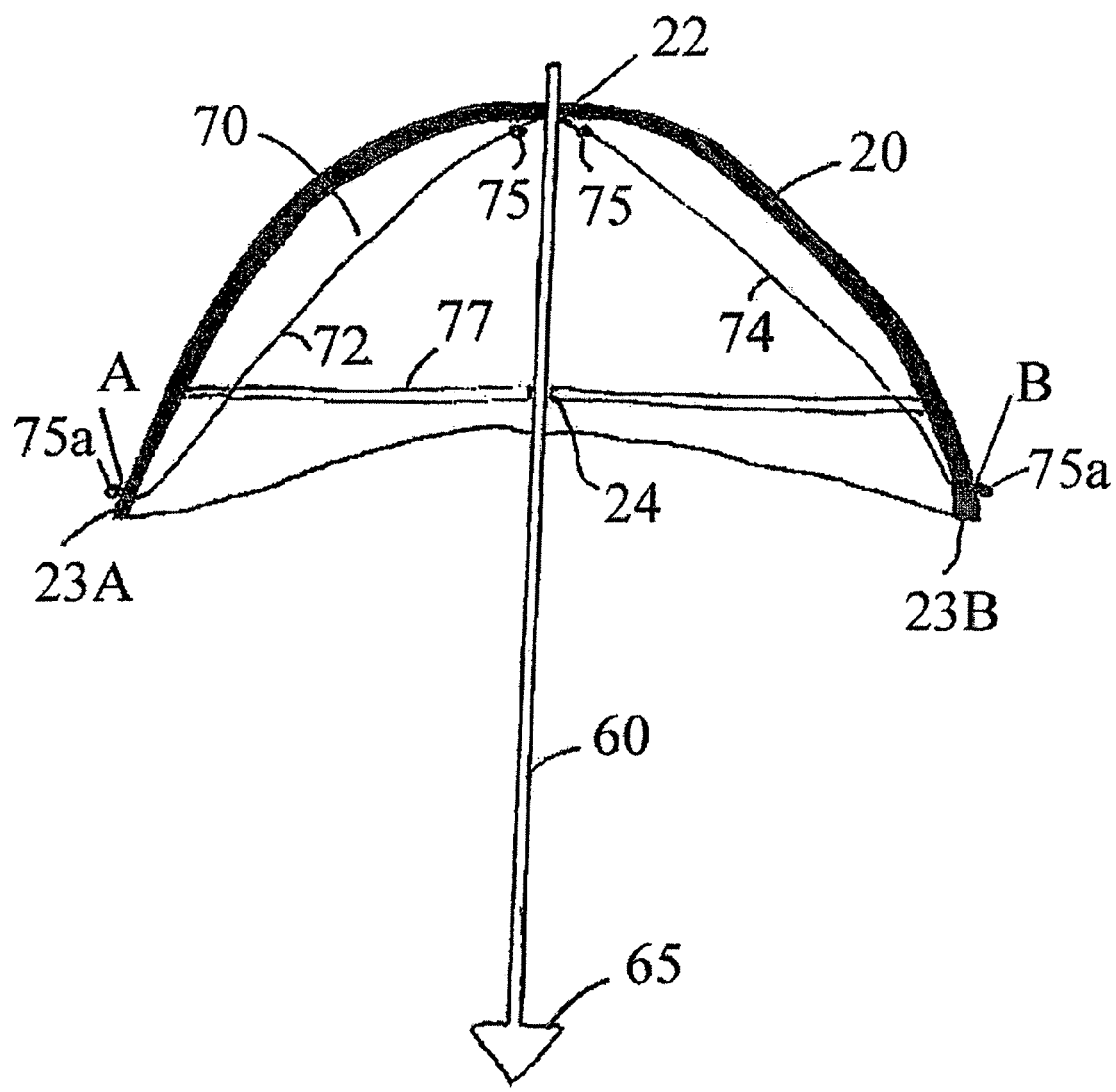
FIG. 3 is a front view of the body harness assembly of the decoy apparatus of FIG. 1.
Figure 4:
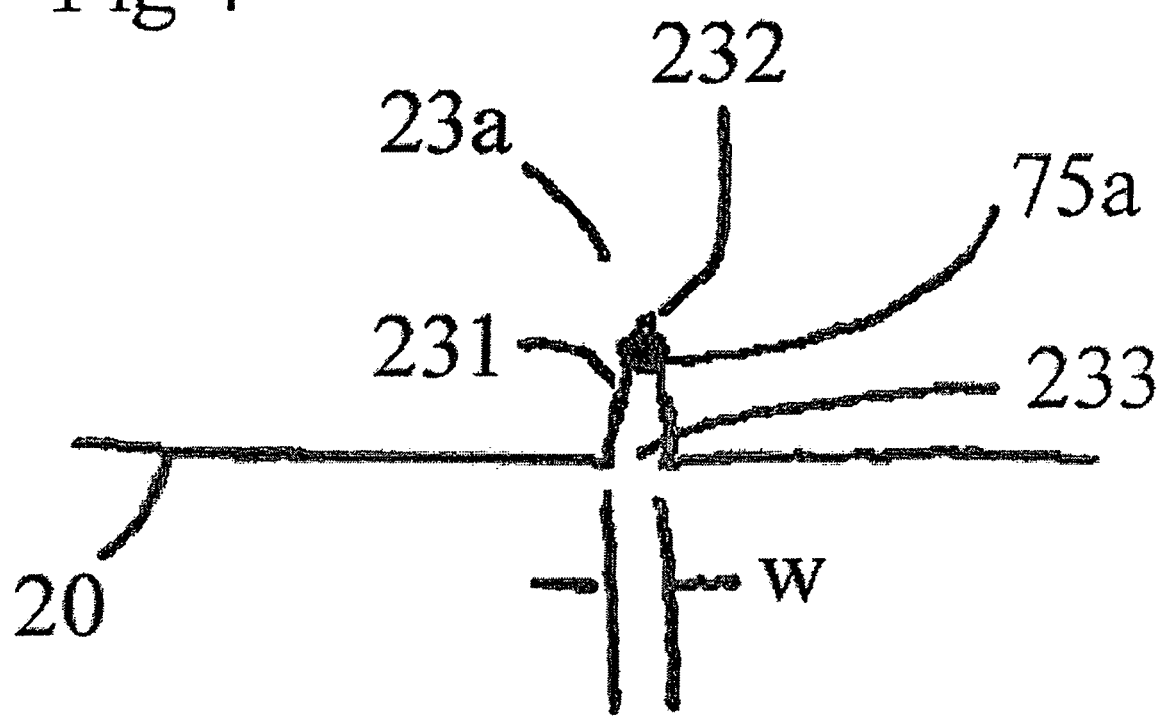
FIG. 4 shows one of the body slots of the decoy apparatus.

Referring now to FIGS. 3 and 4, the apparatus 10 includes the support stake 60 for supporting the decoy 10. The support stake 60 is received through the upper torso aperture 22, passes through the body 20 of the apparatus 10, and extends through the lower torso aperture 24. In particular, an upper end 62 of the stake 60 upwardly extends through the upper torso aperture 22, and a lower end 64, opposite the upper end 62, downwardly extends through the lower torso aperture 24. In the preferred embodiment, the lower end 64 includes a shovel portion 65 that in application, is received in the ground surface. The shovel portion 65 prevents the stake 60 from rotating while placed in the ground. As known in the art, other configurations of the lower end 64 can be incorporated in order to prohibit the stake 60 from rotating. In the preferred embodiment, the shovel is constructed of copper tubing and attached to the lower end 64 of the stake 60 with known attaching means. The stake 60 is preferably constructed of wood material, such as a wood dowel however, the stake 60 can be constructed of other materials known to achieve the described purpose.

As described, the upper end 62 of the stake 60 upwardly extends through the upper torso aperture 22 of the body 20. Preferably, the upper end 62 extends approximately one inch from the upper surface of the body 20. The lower end 64 downwardly extends a selected distance representing the distance required or desired between the decoy 10 and the ground surface for the particular application.

The upper end 62 of the stake 60 includes an attachment opening such as a slot 66.

As will be described the slot 66 is an attachment point for a body harness 70. The body 20 further includes at least a pair of apertures 23A, 23B disposed at lower ends of the body 20. Referring to FIG. 3, the apertures 23A, 23B are shown positioned at points A and B respectively. As will be described, the apertures 23A, 23B are further attachment points for the body harness 70 which among other things, supports the body 20 when attached to the stake 60.

The body harness 70 is preferably constructed of a weatherproof flexible material such as a braided nylon line and attaches the body 20 with the stake 60. The harness 70 primarily serves three functions: (1) supports the body 20 when attached to the stake 60; (2) allows the body 20 to move in various directions, i.e., horizontal, vertical, and orbital; and, (3) causes the body 20 to return from an away position to an idle position after movement in response to the wind and other external stimuli, thereby providing a realistic simulation of a wildfowl for hunting and the like. Movement of the body 20 is driven by the weight of the body acting on the nylon line.

As illustrated, the body harness 70 can consist of a first strap 72 and a second strap 74 (shown in FIG. 3). Each strap can include a knot 75A on its end. The first strap 72 has one end attached to the slot 66 and an opposite end attached to the aperture 23A of the body 20; and, the second strap 74 similarly has one end attached to the slot 66 and an opposite end attached to the aperture 23B of the body 20. In the alternative, the body harness 70 can be constructed as one piece where one end of the harness 70 is attached to aperture 23A, the harness 70 then upwardly extends to the slot 66 of the stake 60, and then the opposite end of the harness 70 downwardly extends from the slot 66 and is attached to the aperture 23B. To prevent the harness 70 from shifting in place and therefore maintain the position of the harness 70 with respect to the slot 66 as well as the stake 60, knots 75 or other suitable means should be disposed in the harness 70 near or adjacent the slot 66. The knots 75 can retain the strap 72, 74 in slots 23A and 23B. Alternatively, the slots 23A and 23B can be narrower than the strap 72, 74 such that the straps 72, 74 can be forced into the slots 23A and 23B and will be retained by the grip of the expanded slot 23A, B. Also as shown in FIG. 3, a strap 77 can be positioned across the inside of the body 20 and the strap 77 can include an aperture 24 for receiving stake 60 at a point lower than aperture 22. The strap 77 could be a nylon line tied between points 23A and 23B, this would allow multiple body shells 20 to be stacked in a nesting fashion for shipping. The upper 22 and lower 24 apertures hold the body 20 in alignment on the stake 60 while allowing for some movement.

As illustrated, points A and B are shown near the lower side of the body 20. The inventor has found that the harness 70 will function similarly if points A and B are raised or lowered.

Raised attachment points in the body 20 will decrease the distance between points A and B and the slot 66, thereby decreasing the length of the harness 70, and increasing the angle relation between the body 20 to the stake 60. As a result, the body 20 motion is more restricted, and the body 20 returns to its idle position more quickly. Lowered attachment points in the body 20 increases the distance between points A and B and the slot 66, thereby increasing the length of the harness 70, and decreasing the angle relation of the body 20 to the stake 60. As a result, the body 20 motion is less restricted, and will cause increase body 20 motion and an increase in time for the body 20 to return to its idle position. Thus the length of the harness controls the speed of the body and the time it takes to return to the idle position. Likewise, a stiffer harness 70 material such as a light wire further restricts body 20 motion causing body 20 to return to its idle position more quickly.

In use, the decoy 10 is placed at any desired hunting location. Multiple body shells 20 can be stacked in a nesting fashion for shipping and for transport to a hunting location. The shovel portion 65 of the stake 60 is inserted into the ground. Next, connect the head 40 to the body 20 by inserting an end 58 of one of the flexible connectors 55 into the body slot 27. The flexible body harness 70 is then connected between the lower apertures 23A, 23B of the body 20. The body 20 is then lifted slightly above the upper end 62 of the stake 60, the flexible body harness 70 is then inserted into the slot 66 of the stake 60, and the body 20 is lowered over the upper end 62 of the stake 60, through the apertures 22,24, until the upper end 62 of the stake 60 upwardly extends from the upper torso aperture 22 as previously discussed. A hunter can control the motion of the body 20 in rotation about the stake 60. The shorter the nylon line of the harness 74, the faster the body will oscillate and the quicker it will return to the idle position shown in FIG. 1. The harness 74 can be shortened simply by tying another knot 75A.

With the proper application of the connector and body harness, the wind acting on the head and body causes the connector 55 to bend enabling the head 40 and body 20 to move relative to each other and, the body harness 70 responds by returning the body 20 to an idle position after movement, thereby providing a realistic simulation of a wildfowl for hunting and the like.

Figure 5:
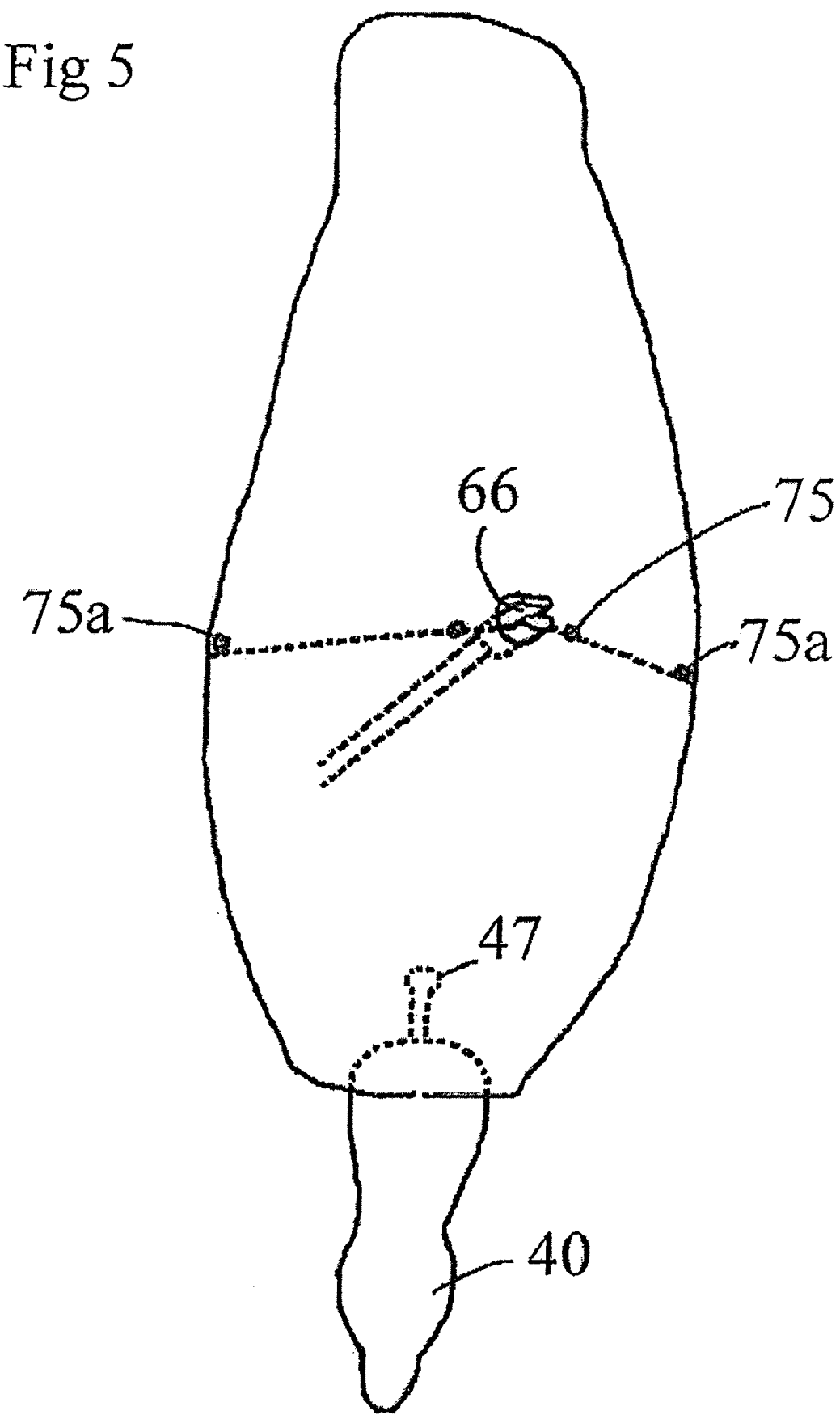
FIG. 5 shows a view of the decoy from above.

FIG. 5 provides a view from above the decoy and shows the nylon line of the body harness 70 received in the slot 66 of the stake. Knots 75 are provided to prevent the body from shifting too far to the left or right of stake 60.

Figure 6:
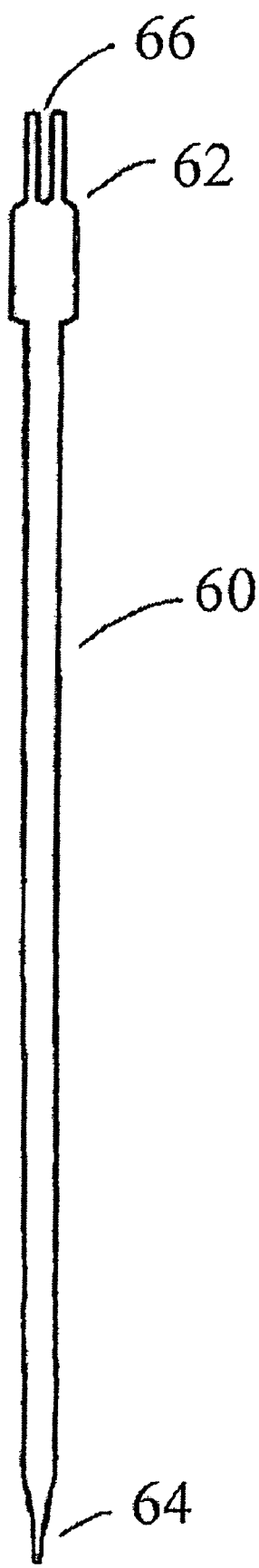
FIG. 6 shows a view of the stake.

FIG. 6 shows the stake 60 including the slot 66 on the upper portion 62 of the stake 60. The stake 60 includes a lower pointed portion 64.

Figure 7:
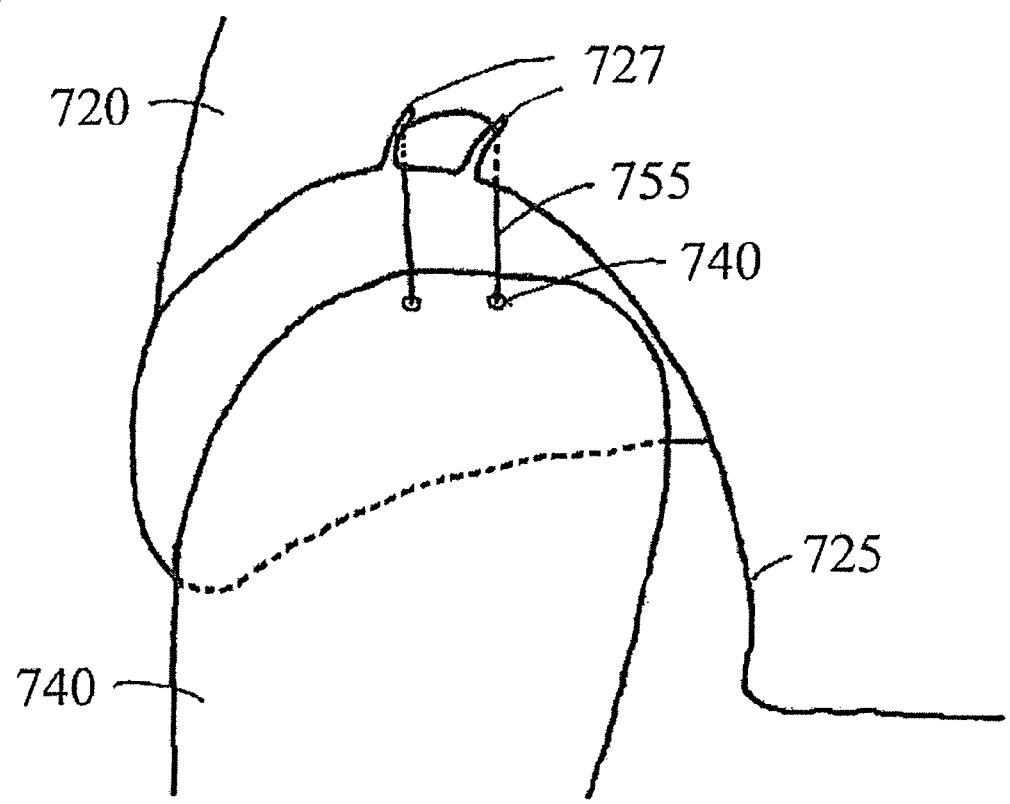
FIG. 7 shows a view of a front detail of an alternate embodiment.

FIG. 7 shows an alternate embodiment of the body 720 and head 740 of the decoy. The body 720 includes a front portion 725 that includes slots 727 to receive flexible connectors 755 which can be a single piece of nylon line received in left and right holes 740. Providing left and right holes 740 will tend to reduce the amount of movement of the head 740 to the left and right compared to the head 40 with a single line connector 55.

Although the description above contains many specificities, these should not be construed as limiting the scope of the invention but as merely providing illustrations of some of the presently preferred embodiments of this invention. It will be obvious to those skilled in the art that modifications may be made to the embodiments described above without departing from the scope of the invention. For example, the above description primarily describes the decoy apparatus as wildfowl for hunting and the like. However, it should be understood the present invention is applicable to deer, turkey, predator decoys and the like, and is further applicable not only for hunters, but for farmers and any other uses that require the application of life-like animals.

Thus the scope of the invention should be determined by the appended claims in the formal application and their legal equivalents, rather than by the examples given.

I claim:

1. A decoy apparatus comprising:

a body, a stake and a head, said body having an upper torso aperture for receipt of said stake, and an open front end having at least one body connection, said head includes at least one pivot connector line designed to be releasably connected with said at least one body connection, said head being suspended both from and below said at least one body connection via said at least one pivot connector line when said at least one pivot connector line is releasably connected with said at least one body connection, an end of said head further includes a counterweight sized and positioned to balance the head in an idle position relative to said body and at least one away position relative to said body away from said idle position such that said counterweight and said head acting on said at least one pivot connector line will bias said head away from said away position back toward said idle position, a body harness, and said stake having an upper end that includes a stake opening used as a first attachment point for said body harness, said body further includes at least a pair of apertures disposed at lower ends of the body, said pair of apertures define second and third attachment points for said body harness, wherein said body harness is centrally connected between the opening in the stake and each of said pair of apertures in the body.

2. The decoy as recited in claim 1, wherein said harness includes a nylon line with at least a first knot on one end of said nylon line and wherein said nylon line attaches to said stake slot to support said body.

3. The decoy as recited in claim 2, wherein said body is a shell formed from a flat sheet of material.

4. The decoy as recited in claim 3, wherein said body includes a body idle position and at least one body position away position away from said body idle position such that a weight of said body acting on said harness tends to bias said body from said body away position back to said body idle position.

5. The decoy as recited in claim 3, wherein said body includes a lower aperture aligned with said upper aperture and said lower aperture receiving said stake and said stake includes a spade on a lower end to prevent turning of the stake in the ground.

6. The decoy as recited in claim 5, wherein the length of said nylon line controls a time it takes for said body to return to said idle position.

7. A decoy apparatus comprising:

a body and a head, said body having an upper torso aperture, and an open front end having at least one body slot, said head includes at least one pivot connector line designed to be releasably connected with said at least one body slot, said head being suspended both from and below said at least one body slot via said at least one pivot connector line when said at least one pivot connector line is releasably connected with said at least one body slot, an end of said head further includes a counterweight sized and positioned to balance the head in an idle position relative to said body and at least one away position relative to said body away from said idle position such that said counterweight and said head acting on said pivot connector will bias said head from said away position back toward said idle position, a body harness, and a stake having an upper end that includes a stake slot used as a first attachment point for said body harness, said body further includes at least a pair of apertures disposed at lower ends of the body, said pair of apertures define second and third attachment points for said body harness, wherein said body harness is centrally connected between the stake slot and each of said pair of apertures in the body.

8. The decoy as recited in claim 7, wherein said harness includes a line with at least a first knot on one end of said line and wherein said line attaches to said stake slot to support to said body.

9. The decoy as recited in claim 7, wherein said body is a shell and wherein a plurality of shells can be nested together for transport.

10. The decoy as recited in claim 9, wherein said counterweight is movable to change the idle position of said head.

11. The decoy as recited in claim 9, wherein said body includes a lower aperture aligned with said upper aperture and said lower aperture receiving said stake and said stake includes a spade on a lower end to prevent turning of the stake.

12. The decoy as recited in claim 7, wherein said body includes an idle position and at least one away from said idle position such that a weight of said body acting on said harness tends to bias said body from said away position back to said idle position.

13. The decoy as recited in claim 12, wherein said harness line comprises a nylon line and the length of said nylon line controls the speed at which said body returns to said idle position.

* * * * *